United States Patent [19]

Nakanishi et al.

[11] 4,160,901

[45] Jul. 10, 1979

[54] COINCIDENCE TESTING METHOD FOR ENHANCING THE RELIABILITY OF OUTPUT DATA FROM A LABEL READER

[75] Inventors: Sadao Nakanishi; Kazuhiro Suzuki; Nobufumi Tokura; Shinichiro Endo, all of Ise, Japan

[73] Assignee: Shinko Electric Co., Ltd., Tokyo, Japan

[21] Appl. No.: 891,218

[22] Filed: Mar. 29, 1978

[30] Foreign Application Priority Data

Apr. 22, 1977 [JP] Japan .................................. 52-46990

[51] Int. Cl.² .......................... G06K 5/00; G06K 7/14; G08C 9/06
[52] U.S. Cl. ................................... 235/437; 235/462; 250/555
[58] Field of Search ....................... 235/437, 462, 463; 250/555, 566, 569

[56] References Cited

U.S. PATENT DOCUMENTS

| | | | |
|---|---|---|---|
| 3,646,324 | 2/1972 | Macey | 235/437 |
| 3,706,887 | 12/1972 | Bickford et al. | 235/437 |
| 3,909,787 | 9/1975 | Laurer et al. | 235/437 |

*Primary Examiner*—Daryl W. Cook
*Attorney, Agent, or Firm*—Lane, Aitken & Ziems

[57] ABSTRACT

A coincidence testing method for enhancing the reliability of output data from a label reader adapted to read a bar code consisting of a plurality of bars. Each bar in the bar code is scanned at a plurality of points and sets of binary symbols representative of the scanned points along each bar are obtained. Then the binary symbols in each set are ordered to correspond to the order of the scanned points or segments along each bar. Then coincidence tests are performed on successive pairs of binary symbols in each set to determine whether a reliable decision can be made for each bar.

2 Claims, 3 Drawing Figures

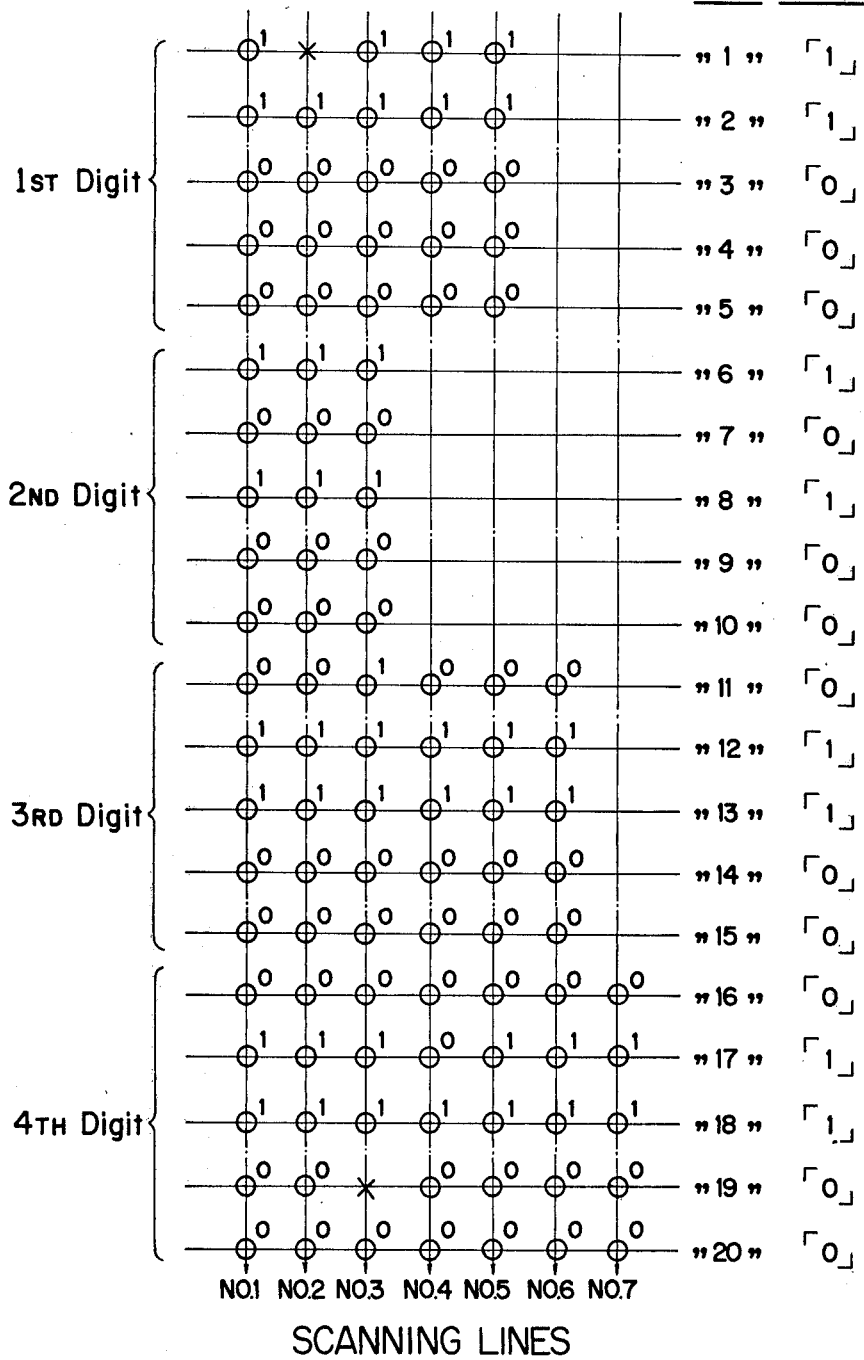

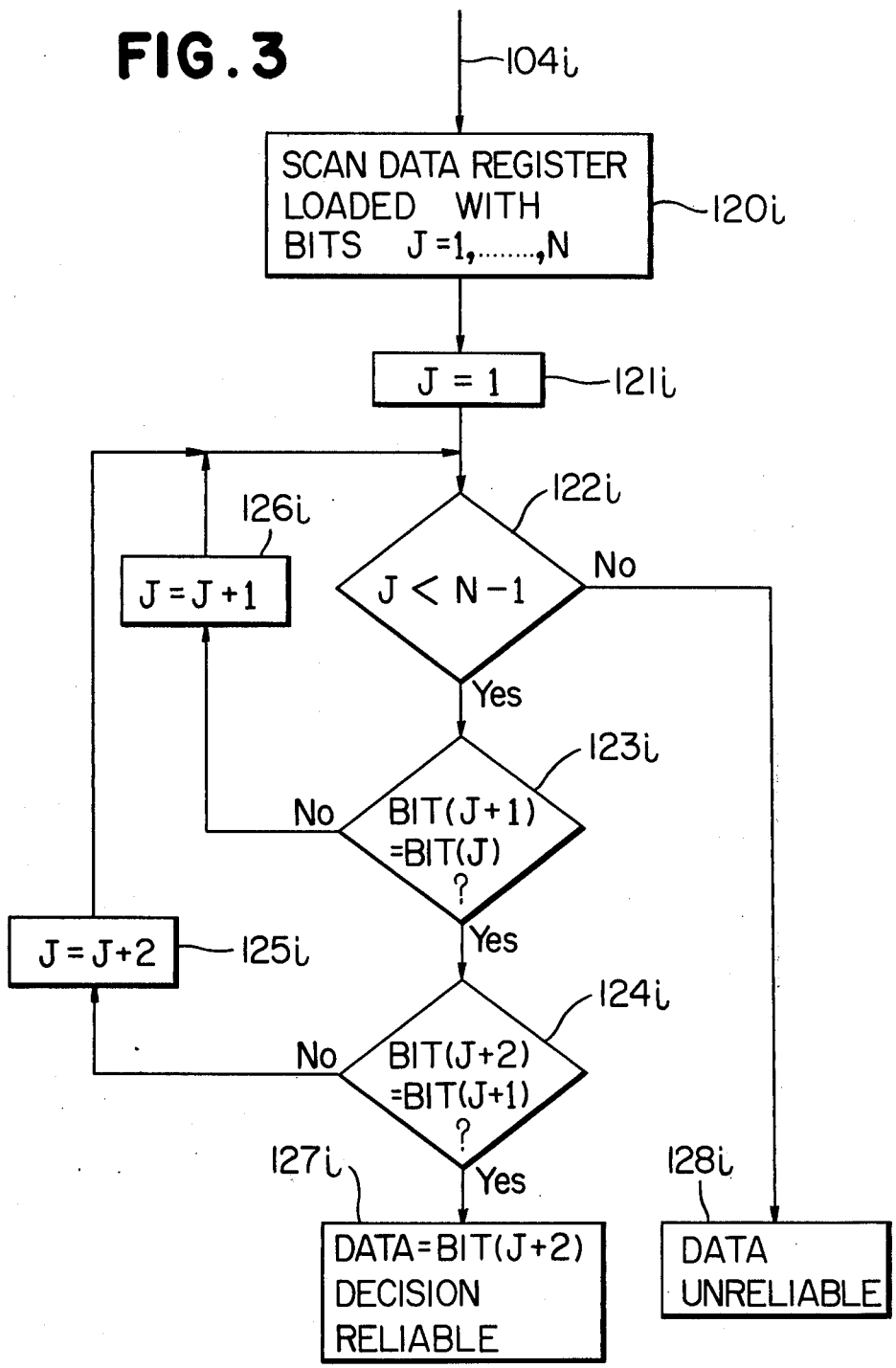

COINCIDENCE TESTING METHOD FOR ENHANCING THE RELIABILITY OF OUTPUT DATA FROM A LABEL READER

BACKGROUND OF THE INVENTION

The present invention relates to a coincidence testing method for enhancing the reliability of the output data from a label reader. Recently, computer based systems for inventory control have seen widespread use in supermarkets, department stores, and the like. The successful operation of these computerized inventory systems is dependent, typically, upon the ability of certain peripheral equipment known as label readers to reliably read data encoded into the labels associated with the inventory items and to provide correct data to the computer.

Typical label codes include so-called bar codes consisting of a plurality of bars with different widths or colors. The arrangement of the bars in such a code can be interpreted to identify the particular goods and the like. Such bar codes are usually printed on a price tag or other label associated with the goods.

However, printed bar codes frequently suffer from defects such as blurring, incomplete or defective bar shapes, bar inclination, fading and similar problems. Such defective bar codes may result in erroneous readings by the label reader. Reading errors, of course, can also occur due to malfunctions in the label reader itself. If erroneous data is provided to the computer by the label reading peripheral equipment, the computer system will then compound the error, and the inventory control system will be ineffective.

SUMMARY OF THE INVENTION

Accordingly, an object of the present invention is to provide a coincidence testing method for enhancing the reliability of the output data from a label reader in order to eliminate erroneous readings such as may occur if a bar code is defective in shape, arrangement, color, etc. The method of the present invention also detects when the data actually read by the label reader is unreliable.

The method includes, in a label reader adapted to read bar codes, scanning each bar in a bar code consisting of a plurality of bars at a plurality of points along each bar and obtaining sets of binary data representative of each of three or more different points along each bar. The binary symbols for each bar are then arranged in an order corresponding to the order of the scanned points or segments along each bar. The binary symbols for each bar thus ordered are then tested to detect the existence or nonexistence of at least two successive coincidences between successive pairs of binary symbols. In the event such successive coincidence exists, it is then determined that the data which meets the coincidence test is reliable. On the other hand, if such successive coincidence does not exist, then the data is regarded as unreliable. A constant assessment is thereby provided of the probable reliability of the output data from the label reader. This minimizes the likelihood of undetected erroneous data being provided to the computer.

Other objects and advantages of the present invention will be apparent from the following description taken in connection with the accompanying drawings.

BRIEF DESCRIPTION OF THE DRAWINGS

FIG. 2 is an illustration of a bar code, further indicating scanning lines and other markings thereon, and useful in describing the method of the invention.

FIG. 3 is a partial block, partial flow diagram useful in describing the method in the present invention.

DESCRIPTION OF THE PREFERRED EMBODIMENT

Figure 1:
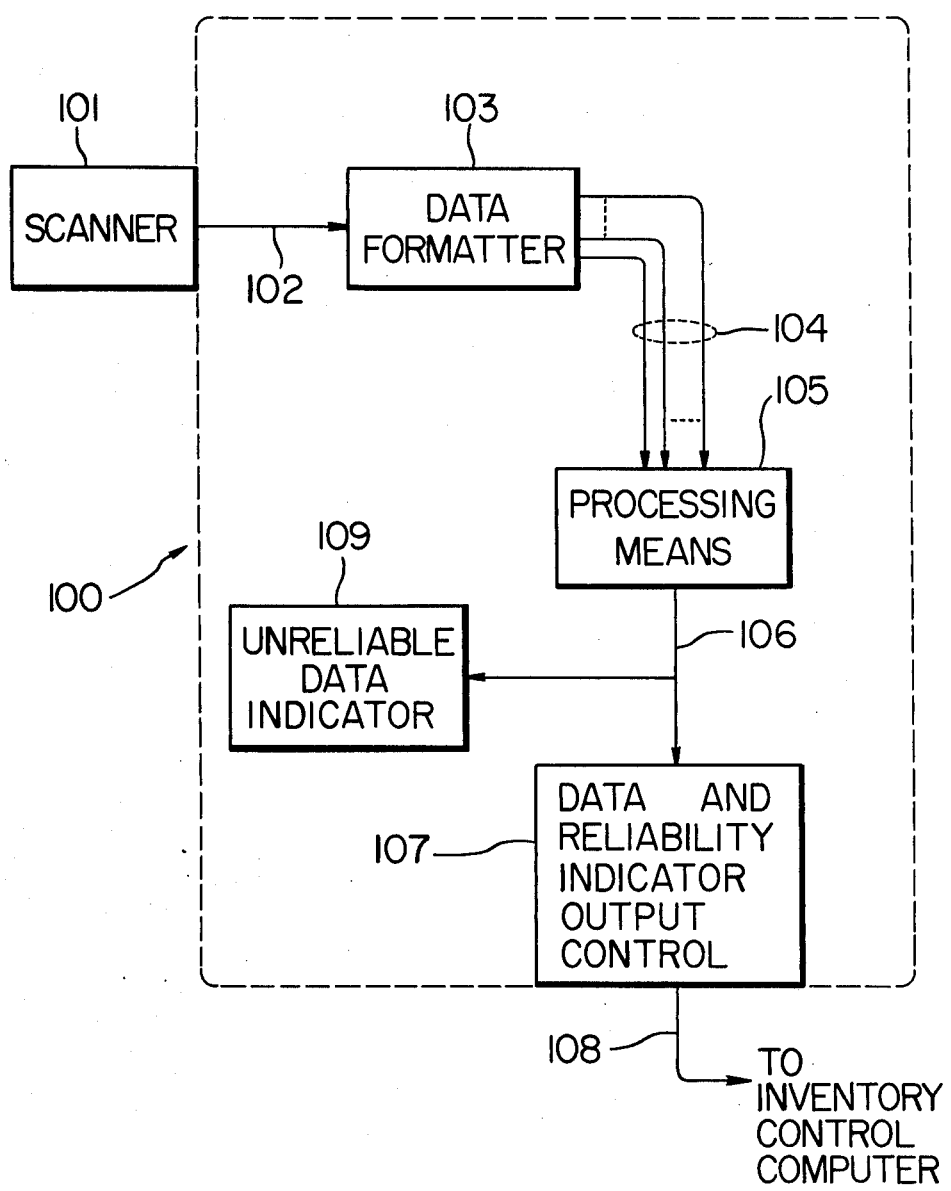
FIG. 1 is a block diagram of a label reader of a type suitable for use with the method of the present invention.

As shown in FIG. 1, a label reader 100 including a scanner 101 is adapted to scan labels, such as bar code labels and to provide data output signals on a signal line 108 to an inventory control computer (not shown). The scanner 101 can be any one of several well known types, and, for example, may includes a plurality of separate optical scanning means (not shown) to simultaneously scan along a plurality of scanning lines. Alternatively, the scanner 101 may contain a fewer number of optical scanning means, but instead employ electromechanical means (not shown) to achieve a desired scanning pattern.

In operation, an item having a label bar code thereon is suitably positioned or caused to move past or relative to the scanning element (not shown) of the scanner 101. This can be accomplished by a manual operator or by automatic handling equipment, depending upon the particular environment. The scanner 101 then scans the label and provides raw output data on a signal line 102, such data being representative of the scanned bar code. The raw data from the scanner 101 is preferably a sequence of binary symbols and is provided as an input to a data formatter 103. The data formatter or demultiplexer 103 separates the raw data into separate bit streams or sets of binary symbols, each being related to a particular bar of the bar code. The output signals on the various signal lines 104 from the data formatter 103 correspond to particular bars of the bar code.

The signal lines 104 are operably connected to the input of a processing means 105 which further processes the raw data from the scanner 101 using a coincidence testing method as will be more fully described. The output from the processing means 105 is provided on a signal line 106 to an output control means 107 and also to a "unreliable data indicator" 109 which preferably is co-located with the label reader. In the event the label reader determines that the scanned data cannot be read reliably, the "unreliable data indicator" 109 provides an indication, for example, to a manual operator so that the label code associated with the particular item just scanned may thereupon be manually read or determined by other means. The output control 107 also controls the output of data and reliability indicator signals to the inventory control computer (not shown) over the signal line 108 as previously described.

In FIG. 2, the horizontal lines labelled 1, 2, . . . 20 represent the center lines for the bars of a 20 line bar code label such as would be affixed to a package or the like. For purposes of explanation, it can be considered that the bars, the center lines which are thus defined, can have different widths, and that the bar width pattern defines the particular bar code to be recognized by the inventory control computer (not shown). For example, it may be assumed for purposes of explanation that a bit "1" would be assigned to a wide bar, and a bit "0" to a narrow bar in such a bar code.

In a bar code of this type, the sequence of bars or of possible bar code positions is usually further segmented into groups having specific meanings. For example, in the illustration in FIG. 2, the combination of bars 1, 2 . . . 5 indicates a first digit of a specific number. Similarly, bars 6, 7, . . . 10 indicate the second digit of a specific number, and so forth. With such a bar arrangement, each bar can be regarded as representing a specific binary bit, and one digit of a specific number is constructed by five bits or five bars. It, of course, is to be understood that the total number of bars in a given bar code can be arbitrary and is not confined to a number, such as 20, as shown in the example in FIG. 2.

In order for a bar code of this type to be read by a label reader 100, the bar code is first brought into an appropriate position relative to the scanner 101. The scanner 101 then performs a scanning sequence along a plurality of scanning lines No. 1, No. 2, . . . , No. 7 as shown in FIG. 2 in a direction transverse to the center lines of the respective bars comprising the bar code. It, of course, is to be understood that the total number of scanning lines transverse to the bars center lines may be an arbitrary or a different number than the 7 scanning lines shown in FIG. 2, but the method of the present invention requires at least 3 lines. This type of scan can be accomplished, for example, either by a sequential scanning movement by a single optical scanner element (not shown), by a simultaneous relative movement of a plurality of scanning elements (not shown) appropriately arranged, or by other equivalent means.

Important to an understanding of the method of the present invention, is the fact that the scanner 101 will potentially provide a raw data output signal for each point at which a scanning line crosses a bar of the bar code in FIG. 2. However, particular raw output data from the scanner 101 may be irrelevant or immaterial in certain instances in view of the consistency test method of the present invention as will be further described.

The symbols ⊕ at selected cross points between the bar center lines and the scanning lines in FIG. 2 indicate scanning points at which the raw data output from the scanner 101 would, most likely, be either a correct "1" or a correct "0," depending upon whether the particular bar just scanned was a wide or a narrow bar. On the other hand, the symbol * at selected intersections designates, for purposes of illustration, unintelligible scanning points for which the scanner 101 cannot be relied upon to produce correct output binary signals. The illustration in FIG. 2 also depicts certain intersections between the bar center lines and the scanning lines which are not marked by * or ⊕ symbols. The output, if any, of the scanner 101 at such scanning points is immaterial in view of the coincidence testing method of the present invention to be further described.

It is also noted that certain of the intersections in FIG. 2 marked with the ⊕ symbol are also marked with "0" or "1" binary symbols. These binary symbol markings are provided to facilitate explanation of the coincidence testing method of the present invention and to present specific numerical examples of that method. The specific data output decisions for each bar are shown in FIG. 2 in the "Output Data Decision" column.

As previously described the raw data output from the scanner 101 is provided to a data demultiplexer 103 which demultiplexes the raw bit stream data and associates it with the particular bars comprising the bar code. A demultiplexer appropriate to the method of the present invention must order the raw bit stream data associated with each particular bar according to the scan line numbers as shown in FIG. 2 so that the demultiplexed binary data will correspond to successive points or segments scanned along each bar of the bar code. The demultiplexed data is thus provided on signal lines 104 to the processing means 105 as previously described.

FIG. 3 illustrates, in part, a processing algorithm implementing the coincidence testing method of the present invention to enhance the reliability of the output data from the label reader and to provide a reliability indicator for such output data. An input signal line 104$i$ carrying the ordered, scanned binary data associated with the ith bar of the bar code is connected to a scanned data register 120$i$. The register 120$i$ is loaded with an ordered set of binary bits 1, 2, . . . , N relating to the ith bar. In the example of FIG. 2, N=7 because there are 7 scanning lines. In the more general case shown in FIG. 3, the N bits, 1, 2, . . . N, in the scan data register 120$i$ will correspond to the N different scanning points or segments, in sequence, successively, along the ith bar.

Once the scanned data register 120$i$ has been appropriately loaded with ordered raw data bits for the ith bar from the formatter 103, the coincidence testing algorithm of FIG. 3 as implemented within the processing means 105 is ready to operate. For purposes of explanation, a variable index number, J, is defined to designate the ordered bit positions in the scanned data register 120$i$. The index J is initially set equal to 1 in the step designated by block 121$i$ in the algorithm. Next, the processor tests whether the index J is less than N−1 as shown by decision block 122$i$. On the first iteration of the algorithm, the index J will, of course, always be less than N−1. If J is less than N−1, the processor then tests whether bit (J+1) in the scanned data register is the same as or coincident with bit (J) in the scanned data register as shown by decision block 123$i$. In the event coincidence does not exist, the value of the index J is then incremented by 1 as shown by block 126$i$, and the processor returns to the decision test shown by block 122$i$. On the other hand, if the coincidence test at the decision block 123$i$ is met, then a further coincidence test is made at the decision block 124$i$ which tests whether the bit (J+2) in the scanned data register 120$i$ is the same as bit (J+1). If this coincidence test is not met, the value of the index J is then incremented by 2 as shown by the block 125$i$, and the processing algorithm returns to the input to the decision block 122$i$ to test whether the value of J is less than N−1. On the other hand, if the coincidence test at the decision block 124$i$ is met, the coincidence testing method of the present invention then determines that a reliable data decision is possible, and more specifically, that the reliable data is the same as that represented by bit (J+2), all as shown by block 127$i$ in FIG. 3. On the other hand, as shown in FIG. 3, if at any time, the index test at decision block 122$i$ indicates the index J has been incremented so that J is no longer less than N−1, then, necessarily, dual successive coincidence tests will not yet have been met, and additionally, insufficient remaining raw data bits will be available to ever permit that test to be met. In such event, then, the coincidence testing method of the present invention will determine that the data is unreliable and that no reliable decision can be made as shown by the block 128$i$ in FIG. 3. If this occurs, it is, in effect, determined that the label reader 100 cannot provide a reliable bar code output data reading for the particular label just read, and the label reader 100 will provide a local "unreliable data indication" to alert a manual operator that the particular label cannot be reliably read by the label reader 100, and, therefore, must be read into the computer (not shown) by some other means.

It may now be seen that the application of the algorithm of FIG. 3 to the sequences of binary symbols marked at the various scanning line intersections along each of the bar center lines in FIG. 2 results in the particular output data decisions shown in the "Output Data Decision" column in FIG. 2. It can now also be further seen from the examples in FIG. 2 that in certain cases, the method or algorithm of the present invention will not need to consider, and, in fact, will disregard certain raw data from the scanner when it is determined that a reliable decision can be made without considering all of the raw data potentially available. This consideration demonstrates that the basic method of the present invention can operate, for example, without requiring the scan data register 120*i* to be fully loaded with all N bits (i.e. bits 1, 2, . . . N) before coincidence testing begins. This consideration could be relevant, for example, to a label reader 100 using a scanner 101 having a single optical means (not shown) which sequentially scanned along each of the scanning lines No. 1, No. 2, . . . No. N as shown in FIG. 2. In such a case, of course, means would have to be provided in the coincidence testing algorithm of FIG. 3 to delay performance, bit by bit, of the coincidence tests at decisions blocks 123*i* and 124*i* until sufficient raw data bits were available in the register 120*i*.

In an actual operating system the processing means 105 would include a similar or equivalent processing sequence for each of the various bars comprising the particular bar code. It will be recognized by those skilled in the art, that the processing means 105, and the coincidence testing method of the present invention may be implemented by digital logic hardware means or partially by such hardware means and partially by software means such as in a microprocessor based system. Indeed, it will be recognized that most of the functions of the label reader 100 as described herein could be implemented in a microprocessor based system, thereby achieving considerable economies in the use of hardware elements. Nevertheless, it is also clear that the method of the present invention may be readily implemented with hardware logic.

It is also seen that the coincidence testing method of the present invention enhances the reliability of the output decision data from the label reader 100 by requiring that the raw data read from the different bars comprising the bar code meet a predetermined standard of internal consistency before an output data decision is made. Although the disclosed embodiment emphasizes a coincidence testing method which tests for two successive coincidences, it will be recognized that other predetermined sequences or numbers of coincidences may be tested for without departing from the principles of the invention. For example, a variant coincidence testing method could require that two or more coincidences occur, but without any requirement that the coincidences occur successively. Similarly, by also providing an unreliable data indication when the coincidence tests are not met, error compounding by the inventory control computer (not shown) can be avoided and a manual operator can be informed that a given label code cannot be reliably read by the label reading equipment.

It will be understood that various changes in the details in the steps of the present invention as herein described and illustrated may be made by those skilled in the art without departing from the scope and the principle of the invention as expressed in the appended claims.

What is claimed is:

1. A coincidence testing method for enhancing the reliability of the output data from a label reader having a scanner and adapted to read a bar code consisting of a plurality of bars comprising the steps of:

obtaining a set of at least three binary signals, each signal in said set being representative of a particular different point along a particular bar as scanned by the scanner;

ordering said binary signals in said set in a sequence corresponding to the ordering of the particular different points along the particular bar;

testing successive adjacent pairs of said ordered binary signals for coincidence;

providing a binary output decision for the particular bar if predetermined coincidence tests are met; and determining that a reliable output decision cannot be made for the particular bar if predetermined coincidence tests are not met.

2. The method according to claim 1 wherein the bars comprising said bar code comprise a mix of wide bars and narrow bars.

* * * * *